June 23, 1931. W. SCHWERDTFEGER 1,811,157
CENTRIFUGAL APPARATUS FOR PURIFYING OIL
Original Filed Dec. 10, 1928
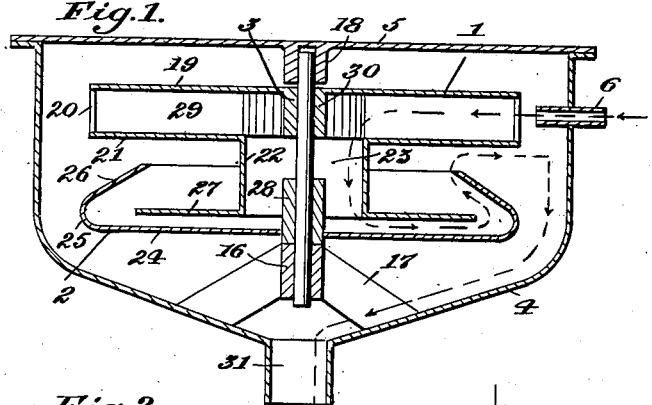
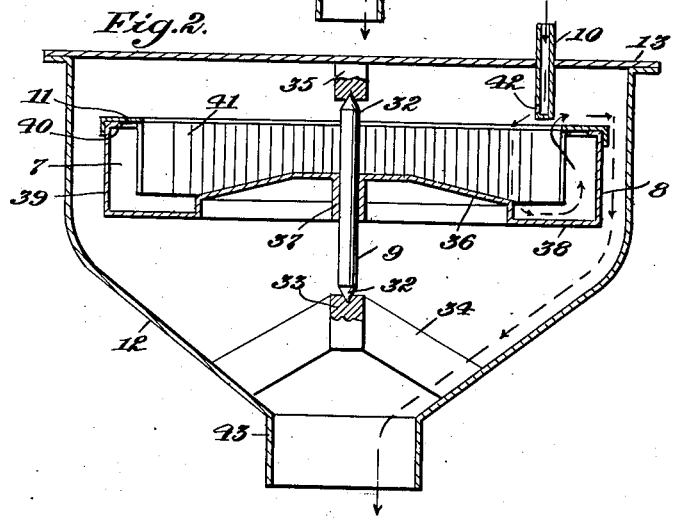
Inventor:
Walter Schwerdtfeger,
by Langner, Parry, Card & Langner
Att'ys.

Patented June 23, 1931

1,811,157

UNITED STATES PATENT OFFICE

WALTER SCHWERDTFEGER, OF RATHENOW, GERMANY

CENTRIFUGAL APPARATUS FOR PURIFYING OIL

Application filed December 10, 1928, Serial No. 324,897, and in Germany January 2, 1928. Renewed February 3, 1930.

The processes and devices for cleaning dirty oil by centrifugal force are known. Hitherto such devices have been driven by belts, or directly by means of electric motors, it has also been proposed to drive them by means of a turbine.

The present invention relates to an improved means for driving such oil centrifuges, according to which the dirty oil itself is used for driving the centrifuge. To this end the oil is first put under pressure and then used for injection into a turbine wheel, the latter directly or indirectly driving the oil centrifuge into which the oil to be cleaned is fed.

The invention can be carried out in such a manner that the oil under pressure after leaving the turbine wheel, flows directly into the bowl of the centrifuge.

The invention can advantageously be applied to machines which in their operation, e. g. for lubricating the bearings, use oil circulating under pressure, for example internal combustion engines for motor vehicles.

The advantage of the invention lies in the fact that it does away with the use of toothed wheels or other gear for driving the oil centrifuge.

The application of the invention to those machines which use oil under pressure is best effected by having a branch leading from the oil pressure supply pipe to the turbine wheel. The oil from this pressure pipe can then, after leaving the turbine wheel, flow directly into the centrifuge and thence, on the cleaning being completed, to the circulating oil collecting tank.

It is a further and important object of the invention to provide a structure which is capable of operating efficiently where there is a small supply of oil as in internal combustion engines used in automobile motors where relatively only small amounts of oil are available for the operation of the turbine wheel.

A further object of the invention is to utilize a jet of impure oil impinging directly on the vanes of the turbine in order to rotate the turbine and thereby the centrifuge bowl in order to secure separation of the impurities in the oil from the pure oil. From experiments it has been found that a reaction turbine which operates due to the reaction of the ejected fluid upon the rotor is not efficient and practical due to the fact that such a type of turbine requires a relatively large amount of oil or fluid under pressure in order to operate the same efficiently. Of course in the motors indicated such relatively large amount of oil is not available and therefore the invention contemplates the utilization of the direct jet upon the vanes of the rotating element in order to secure the proper centrifugal action.

The invention contemplates also the construction of a separator which is extremely light in weight and which is extremely simple and fool-proof and which is not liable to be rendered inoperative easily.

With these and other objects in view which will become apparent as the description proceeds, the invention consists in the combination and arrangement of the various elements hereinafter described and claimed.

In the drawings,

Figure 1 is a cross-sectional view with the various parts shown partly in cross-section, partly in elevation and partly diagrammatically;

Figure 2 is a similar view showing a modification.

Referring to the drawings in which similar reference characters illustrate similar parts in all the different views, 1 indicates the turbine impeller having vanes of any desired type adapted to be impinged directly by the jet of oil projected under pressure through the nozzle 6. The nozzle 6 is located in the side of the casing 4, as shown in Figure 1. The turbine element is mounted in bearings of any desired type 16 supported from the casing 4 by the spider 17 and the upper end of the shaft 3 is rotatably secured in the bearing 18 provided upon the under side of the cover 5 for the casing 4.

The turbine has preferably an imperforate top surface 19 while the periphery 20 is open so that the jet from the nozzle 6 can have free access to the vanes located between the top surface 19 and the bottom surface 21 of the turbine. It is of course understood that the nozzle 6 is directed in such fashion that the jet is thrown against the vanes in a substantially tangential direction. The lower surface 21 upon the turbine is directed downwardly at the inner end thereof in a plane concentric with the shaft 3 as shown at 32 so as to form a conduit 23 for the passage of the oil to the centrifuge bowl hereinafter described.

The centrifuge bowl is indicated generally at 2 and consists of an imperforate bottom surface 24 having the periphery thereof turned upwardly at 25 and then inwardly at 26 so as to form an overhanging barrier or wall which will retain impurities therein. The conduit wall 22 at the lower end thereof is directed upwardly as shown at 27 and terminates closely adjacent to the bend 25 in the centrifuge bowl 2. The centrifuge bowl is provided with a bearing 28 which is fixed non-rotatably upon the shaft 3 below the turbine and extending into the conduit 23 and supported upon the bearing 16. It is of course evident that any anti-friction means desired may be located between the bearing 16 and the bearing 28 in order to decrease the resistance to the rotation of the centrifuge bowl to a minimum. The vanes 29 of the turbine extend from the outer periphery of the turbine elements between the top 19 and the bottom 21 and terminate short of the bearing element 30 of the turbine. The bearing element 30 is fixed to the shaft 3. The course of the oil through the turbine element and through the centrifuge bowl is indicated by the arrows in Figure 1 and after leaving the centrifuge bowl the pure oil escapes from the casing 4 through the conduit or outlet 31. The nozzle 6 is intended to be connected to the pressure supply pipe, not shown, and the conduit 31 is connected so as to lead the purified oil to the circulating oil collecting tank. It is of course apparent that the cover element 5 for the casing 4 can be secured removably in any manner desired to the casing 4. The intention is that the cover 5 may be easily removed so as to allow free access to the turbine and also the centrifuge bowl for the purpose of cleaning these elements at fairly frequent intervals. It is apparent that the modification above described can be easily manufactured from stamping sheet metal and will be exceedingly light in weight while at the same time practical and efficient.

The modification shown in Figure 2 will now be described. In this modification the turbine impeller 7 is directly combined with the centrifuge bowl 8 in order to minimize space and material. A shaft 9 is provided with tapered ends 32. The lower end is seated in a notch provided in the lower bearing element 33 which is supported by the spider 34 secured to the casing 12. The upper end 32 is seated in a notch bearing element 35 secured to the central portion of the undersurface of the cover 13. It is apparent that this type of mounting for the turbine and the centrifuge bowl eliminates friction to a large extent, allowing these elements to be rotated very easily.

The centrifuge bowl 8 in this modification is provided with a bottom 36 at the central portion of which is an aperture abutment 37 through which the shaft 9 passes and to which it is fixed. A circular trough-shaped member 37 is integral with or secured to the outer periphery of the bottom 36 and the trough-shaped member 38 is provided with an upstanding wall 39 at the outer periphery thereof. Secured frictionally to the upper end of the wall 39 is the cover 40 and the vanes 41 are either punched out of the metal upon a depending portion of the cover 40 or secured thereto in any desired manner. The upper wall or cover 40 of the bowl is provided with openings 11 to allow the passage of the purified oil.

In this modification the nozzle connected to the oil pressure pipe is located in the cover 13 of the casing and can be directed at an angle to the axis of the shaft 9 or can be provided with a diagonally extending port 42, as shown in order to jet the oil against the vanes in a substantially downwardly tangential direction. The outlet port for the pure oil is indicated at 43 in this modification. The course that the oil takes through the turbine and thence through the centrifuge bowl and thence out through the port 43 is indicated by arrows in Figure 2.

The operation of both of the above modifications is substantially the same. The oil under pressure in an exceedingly fine jet so as to secure the greatest velocity strikes the vanes upon the turbine and thereby rotates the turbine and with the turbine the centrifuge bowl. This will cause, due to centrifugal action, the heavier impurities in the oil to be projected furtherest from the axis of rotation. In Figure 1 the impurities will be collected within the bent portion 25 of the centrifuge bowl 2 while in Figure 2 the impurities will be collected in the trough-shaped portion of the centrifuge bowl. The pure oil in Figure 2 will be projected upwardly through the apertures 11 and thence out through the outlet 43 of the casing 12. The modification shown in Figure 2 is simpler than the modification shown in Figure 1 and is less expensive to manufacture because the turbine and the bowl are combined in a single unit. It is of course obvious that the upper cover 40 upon the trough-shaped portion 38 is removably secured to the trough-shaped portion 38 in order to allow for easier access to the impurities contained in the bowl. It is also self-evident that if desired gauze and similar material may be used in order to retain impurities in the trough-shaped portion 38 more securely, but as a general rule the impurities will contact and be secured to the outside wall 39 due to the gummy character of the oil itself.

It is to be understood that various modifications and changes may be made in the constructions above set forth and it is my intention to include all such obvious changes and arrangements as may fall within the scope of the following claims.

I claim:

1. An apparatus for cleaning lubricating oil comprising a casing, a shaft rotatably mounted in said casing, a centrifugal separating means mounted upon said shaft and a jet impelled turbine operated by the oil to be cleaned also located within said casing for rotating said separating means.

2. An apparatus for cleaning lubricating oil comprising a casing, centrifugal separating means rotatably mounted within said casing and a jet impelled turbine operated by the oil to be cleaned nested in said separating means for rotating said separating means.

3. An apparatus for cleaning lubricating oil comprising a centrifuge having a bowl acting to separate the impurities from the oil, an impeller mounted within the bowl of the centrifuge, a casing for the device, a cover for said casing, a tube passing through said cover for supplying oil to actuate the impeller, a cover for the bowl of the centrifuge, said last named cover having openings therein for the passage of the oil to the casing of the device and said casing having an opening for the escape of oil.

4. An apparatus for cleaning lubricating oil comprising a centrifuge having a bowl acting to separate the impurities from the oil, an impeller mounted within the bowl of the centrifuge, a casing for the device, a cover for said casing, a tube passing through said casing for supplying oil to actuate the impeller, a cover for the bowl of the centrifuge, said last named cover having openings therein for the passage of the oil to the casing of the device and said casing having an opening for the escape of oil.

5. An apparatus for cleaning lubricating oil comprising a casing, a shaft rotatably mounted in said casing, a centrifuge fixed to said shaft comprising a bowl and an impeller located within said bowl and connected to said bowl, a tube passing through said casing for supplying oil to be cleaned and to actuate said impeller and said casing having an outlet for the escape of the cleaned oil.

6. An apparatus for cleaning lubricating oil comprising a casing, a jet impelled turbine rotatably mounted within said casing, a tube passing through said casing for supplying oil to be cleaned, and for actuating said turbine, a centrifugal separating means actuated by said turbine and said casing having an outlet for the cleaned oil.

7. An apparatus for cleaning lubricating oil in engines having forced lubrication comprising a centrifuge, an impeller for driving said centrifuge, vanes upon said impeller, a nozzle located adjacent said impeller by which the oil to be cleaned under pressure is directed against said vanes and means for conducting the cleaned oil back to the engine oil supply.

In testimony whereof I have affixed my signature.

WALTER SCHWERDTFEGER.